United States Patent
Liu et al.

(10) Patent No.: US 7,266,258 B2
(45) Date of Patent: Sep. 4, 2007

(54) TWO-PHOTON ABSORPTION GENERATED CARRIER LIFETIME REDUCTION IN SEMICONDUCTOR WAVEGUIDE FOR SEMICONDUCTOR BASED RAMAN LASER AND AMPLIFIER

(75) Inventors: Ansheng Liu, Cupertino, CA (US); Mario J. Paniccia, Santa Clara, CA (US); Haisheng Rong, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 10/933,652

(22) Filed: Sep. 2, 2004

(65) Prior Publication Data

US 2005/0265679 A1    Dec. 1, 2005

Related U.S. Application Data

(60) Provisional application No. 60/575,481, filed on May 28, 2004.

(51) Int. Cl.
*G02F 1/025* (2006.01)
*G02F 1/295* (2006.01)
*G02F 1/35* (2006.01)
*H01S 3/30* (2006.01)

(52) U.S. Cl. .................. 385/8; 385/2; 372/3; 359/334; 359/327

(58) Field of Classification Search ............. None
See application file for complete search history.

(56) References Cited

U.S. PATENT DOCUMENTS 4,786,129 A    11/1988   Webb
5,754,714 A     5/1998   Suzuki et al.
5,920,666 A     7/1999   Digonnet et al.

(Continued)

FOREIGN PATENT DOCUMENTS

WO    WO 2006/028621 A2    3/2006

(Continued)

OTHER PUBLICATIONS

Mizunami T. et al., "Short-Wavelength Stimulated Raman Scattering in a Silica Fiber Pumped by an XeBr Excimer Laser," IEEE Journal of Quantum Electronics, vol. 25, No. 8, pp. 1917-1920, Aug. 1, 1989.

(Continued)

*Primary Examiner*—Michelle Connelly-Cushwa
*Assistant Examiner*—Jerry T. Rahll
(74) *Attorney, Agent, or Firm*—Blakely, Sokoloff, Taylor & Zafman LLP

(57) ABSTRACT

A semiconductor based Raman laser and/or amplifier with reduced two-photon absorption generated carrier lifetimes. An apparatus according to embodiments of the present invention includes optical waveguide disposed in semiconductor material and a diode structure disposed in the optical waveguide. The optical waveguide is to be coupled to a pump laser to receive a first optical beam having a first wavelength and a first power level to result in emission of a second optical beam of a second wavelength in the semiconductor waveguide. The diode structure is to be biased to sweep out free carriers from the optical waveguide generated in response to two photon absorption in the optical waveguide.

36 Claims, 19 Drawing Sheets

U.S. PATENT DOCUMENTS

| | | | |
|---|---|---|---|
| 6,563,627 B2* | 5/2003 | Yoo | 359/326 |
| 6,674,773 B1* | 1/2004 | Cotteverte et al. | 372/6 |
| 6,999,670 B1* | 2/2006 | Gunn et al. | 385/131 |
| 2004/0090661 A1 | 5/2004 | Nicolaescu | |

FOREIGN PATENT DOCUMENTS

| WO | WO 2006/063348 A1 | 6/2006 |
|---|---|---|
| WO | PCT/US2005/027631 | 9/2006 |

OTHER PUBLICATIONS

Claps R. et al., "Observation of stimulated Raman amplification in silicon waveguides," Optics Express, vol. 11, No. 15, pp. 1731-1739, Jul. 28, 2003.

Rong H. et al., "An All-silicon Raman laser," NATURE, vol. 433, No. 7023, pp. 292-294, Jan. 20, 2005.

* cited by examiner

TWO-PHOTON ABSORPTION GENERATED CARRIER LIFETIME REDUCTION IN SEMICONDUCTOR WAVEGUIDE FOR SEMICONDUCTOR BASED RAMAN LASER AND AMPLIFIER

RELATED APPLICATION

This application claims the benefit of U.S. Provisional Application No. 60/575,481, filed May 28, 2004.

BACKGROUND OF THE INVENTION

1. Field of the Invention

Embodiments of invention relate generally to optical devices and, more specifically but not exclusively relate to semiconductor-based optical amplification and lasing.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include lasers, optical amplifiers, WDM transmitters and receivers, optical filters such as diffraction gratings, thin-film filters, fiber Bragg gratings, arrayed-waveguide gratings and optical add/drop multiplexers.

Lasers are well known devices that emit light through stimulated emission and produce coherent light beams with a frequency spectrum ranging from infrared to ultraviolet and may be used in a vast array of applications. In optical communications or networking applications, semiconductor lasers may be used to produce light or optical beams on which data or other information may be encoded and transmitted.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for reducing two-photon absorption generated carrier lifetimes in a semiconductor waveguide for semiconductor based Raman lasers are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
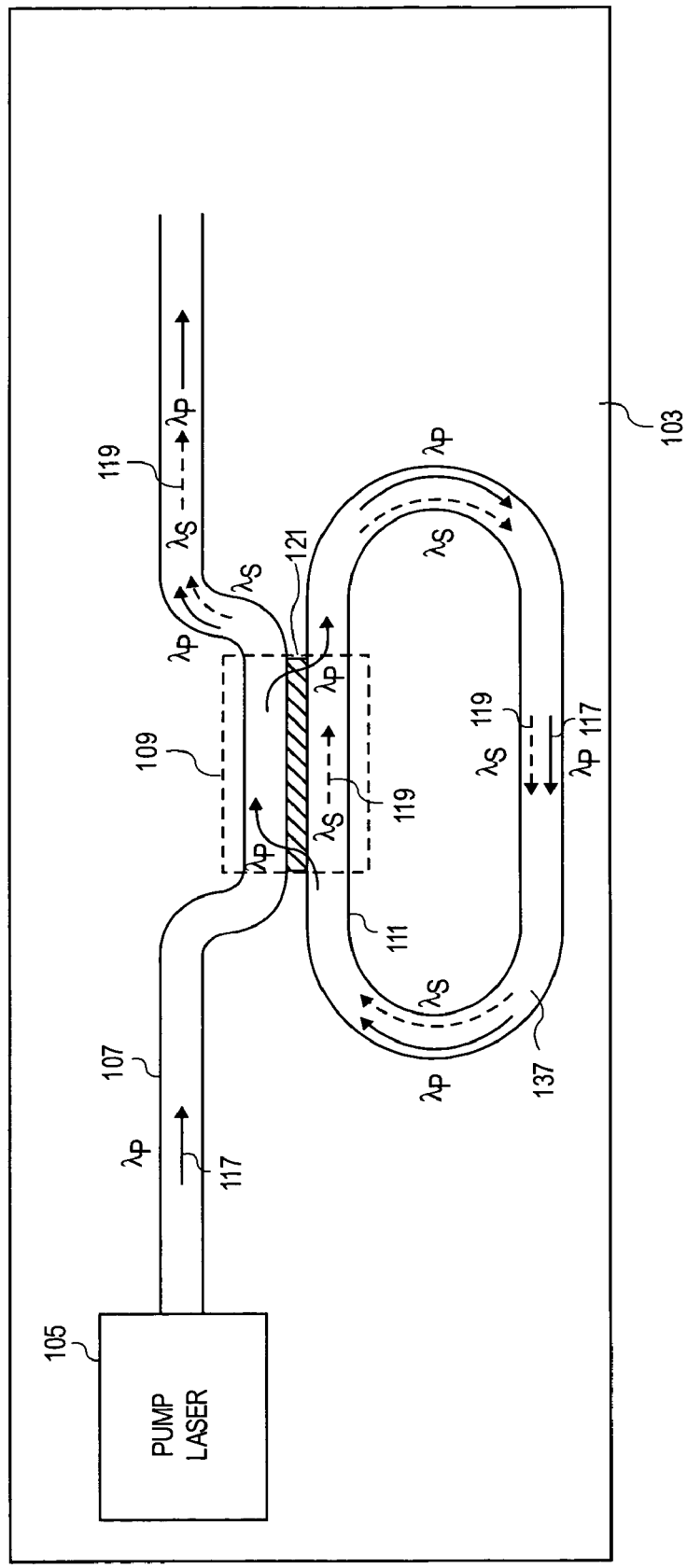
FIG. 1 is a block diagram illustrating a semiconductor-based stimulated Raman scattering (SRS) laser, according to one embodiment of the present invention.

FIG. 1 illustrates an optical device 101 including semiconductor material 103 having disposed thereon a silicon-based stimulated Raman scattering (SRS) laser, according to one embodiment of the present invention. In one embodiment, optical device 101 is implemented using a silicon substrate for semiconductor material 103. In one embodiment, semiconductor material 103 is part of a silicon-on-insulator (SOI) wafer. As shown in the depicted embodiment, optical device 101 includes a pump laser 105, which generates a first optical beam 117 of a first wavelength $\lambda_P$ having a first power level. In one embodiment, pump laser is a continuous wave laser that generates a continuous wave laser beam. In another embodiment, pump laser 105 is a pulse laser that generates a pulsed laser beam. Optical beam 117 is directed from pump laser 105 through a first optical waveguide 107 defined in semiconductor material 103.

In one embodiment, a wavelength selective optical coupler 109 is coupled to receive optical beam 117 at one of two inputs of optical coupler 109. As shown in the embodiment of FIG. 1, optical coupler 109 includes first optical waveguide 107 and second optical waveguide 111 disposed in semiconductor material 103. An insulating region 121 is disposed between optical waveguides 107 and 111 to provide a coupling region in semiconductor material 103 between optical waveguides 107 and 111. In this embodiment, the optical waveguides of optical device 101, including optical waveguides 107 and 111, are each implemented in a silicon substrate so as to have silicon cores. In other embodiments, these waveguides may have a core formed from a different material or materials.

For explanation purposes, as shown in FIG. 1, the first input and first output of optical coupler 109 correspond to the input and output, respectively, of the first optical waveguide 107 portion of optical coupler 109. Similarly, the second input and second output of optical coupler 109 correspond to the input and output, respectively, of the second optical waveguide 111 portion of optical coupler 109.

In embodiment depicted in FIG. 1, the second output of optical coupler 109 is optically coupled back to the second input of optical coupler 109, which defines a first ring resonator 137 in semiconductor material 103. In operation, first optical beam 117 is received at the first input of optical coupler 109 through first optical waveguide 107. As will be discussed in greater detail below, optical coupler 109 is wavelength selective and therefore transfers first optical beam 117 of wavelength $\lambda_P$ from first optical waveguide 107 to the second output of optical coupler 109 through second optical waveguide 111. Accordingly, first optical beam 117 is propagated around ring resonator 137 through second optical waveguide 111.

In accordance with the teachings of the present invention, pump laser 105 provides an optical pump signal for use in generating spontaneous Raman scattering and amplifying the Raman signal of a selected frequency via stimulated Raman scattering (SRS). When SRS occurs in the medium, some of the energy of the pump signal is converted to light of a different frequency. This difference or shift in frequency is called the Raman frequency shift.

Therefore, in the illustrated embodiment, pump laser 105 outputs the pump signal with first optical beam 117 of wavelength $\lambda_P$ via first optical waveguide 107. First optical beam 117 is transferred to propagate around ring resonator 137. As will be discussed in greater detail below, in one embodiment, the power level of first optical beam 117 is sufficient to cause emission of a second optical beam 119 of a second wavelength $\lambda_S$ in ring resonator 137.

A value for the SRS gain coefficient for a material pumped at a wavelength $\lambda_P$ can be found by Equation 1:

$$g = 16\pi^3 c^2 S/(h\omega_s^3 n_s^2 (N_0+1)\Gamma) \qquad (1)$$

where S is the spontaneous Raman scattering coefficient (proportional to $\omega_s^4$), h is Planck's constant, $n_s$ is the refractive index of the waveguide core material at the Stoke's frequency, $\omega_s$ is the angular frequency of the Stokes emission, $N_0$ is the Bose factor and $\Gamma$ is one half the full width at half maximum of the Stokes line (in units of angular frequency). Equation 1 (due to the $\omega_s^4$ factor of S) shows that the gain coefficient is linearly dependent on the Stokes angular frequency.

Therefore, in one embodiment, the second wavelength $\lambda_S$ of the second optical beam 119 propagating around ring resonator 137 corresponds to a frequency substantially equal to the first order Stokes frequency of the first optical beam 117. In operation, the second optical beam 119 is received at the second input of optical coupler 109 through second optical waveguide 111.

As mentioned above, optical coupler 109 is designed in one embodiment to be wavelength selective such that a substantial portion of second optical beam 119 received at the second input of optical coupler 109 is output from the second output of optical coupler 109 through second optical waveguide 111. As a result, a substantial portion of second optical beam 119 is recirculated in ring resonator 137 and therefore continues to propagate around and around ring resonator 137 through second optical waveguide 111. As second optical beam 119 propagates with the pump signal, first optical beam 117, through ring resonator 137, second optical beam 119 is amplified via SRS in ring resonator 137. In addition, it can also be described that lasing occurs in ring resonator 137 with the medium of ring resonator 137 functioning as a lasing medium stimulating the emission of second optical beam 119 as it is recirculated around ring resonator 137. As a result, second optical beam 119 is amplified and a leaked portion of second optical beam 119 is output from the first output of optical coupler 109 through first optical waveguide 107 in accordance with the teachings of the present invention.

Thus, pump optical beam 117 serves as a pump beam to induce Raman gain in optical device 101 and produces light amplification and laser in semiconductor material, such as for example silicon according to embodiments of the present invention. In the wavelength range of 1.3-1.6 μm for the optical communication band, silicon exhibits notable two-photon absorption (TPA), which is a third-order nonlinear optical effect. Generally, the linear absorption is negligible because the one-photon energy is smaller than the energy band gap of silicon. However, in the high optical pump intensity in for example continuous wave excitation, the TPA generates free carriers in silicon and consequently induces additional optical absorption for both the pump and Raman signal beams. This reduces or eliminates the net optical gain in silicon waveguide even when the pump intensity is high, which is when one might otherwise expect that the Raman gain would increase with increasing the pump intensity.

In the presence of both the TPA and TPA-induced free carrier absorption, a nonlinear dependence of the output pump intensity on the input intensity is expected. For instance, modeling and experiments suggest that for example a 5 cm-long silicon waveguide in SOI with 1.5 μm$^2$ effective core area, the carrier lifetime is approximately 23 ns. As the photo-generated free carrier density depends on both the pump intensity and effective carrier lifetime, reducing the carrier lifetime reduces the TPA induced free carrier loss according to embodiment of the present invention. In turn, one can obtain a larger Raman gain and ultimately produce silicon Raman laser in accordance with the teachings of the present invention.

In one embodiment, a reverse biased P-I-N semiconductor waveguide is employed to reduce TPA induced free carrier density to help achieve Raman lasing. The reverse bias in the P-I-N diode structure is used according to embodiments of the present invention to accelerate the carrier in the semiconductor waveguide region. The carrier transit time or lifetime to cross the optical mode region determines the TPA-induced carrier density.

Figure 2A:
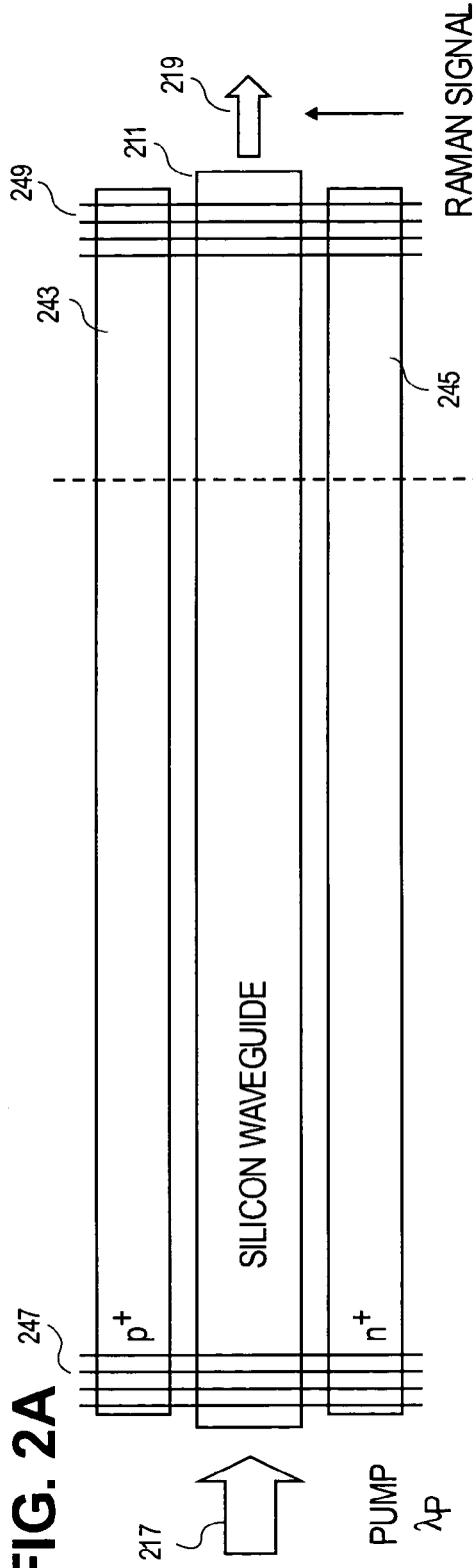
FIG. 2A is a top view illustration of a semiconductor waveguide including a P-I-N diode structure to reduce two-photon absorption generated carrier lifetimes in the semiconductor waveguide in accordance with the teachings of the present invention.
Figure 2B:
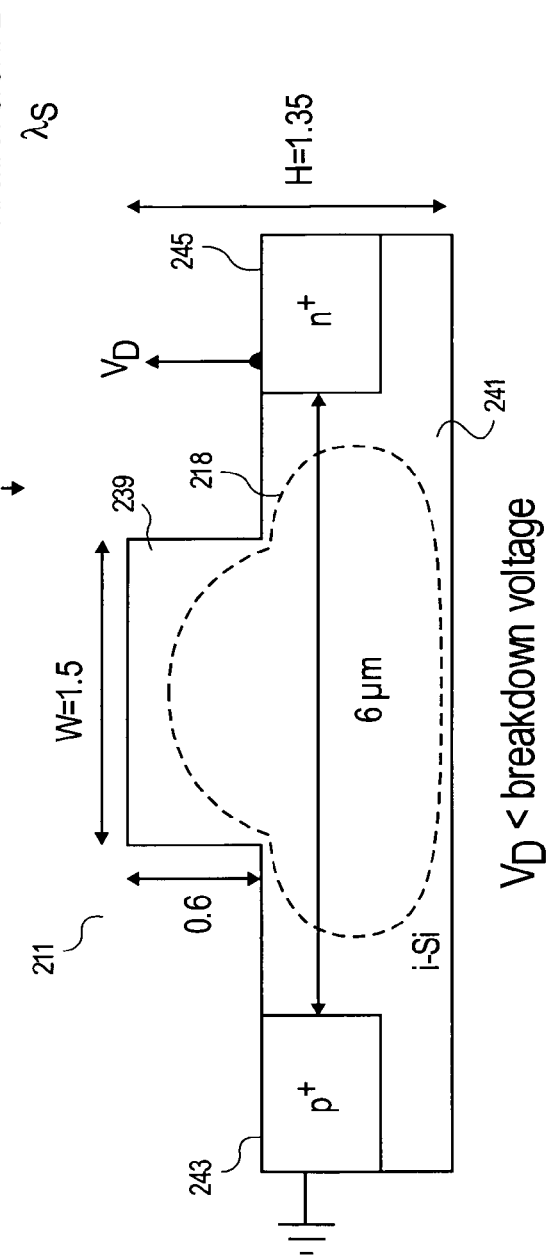
FIG. 2B is a cross section view illustration of a semiconductor waveguide including a P-I-N diode structure to reduce two-photon absorption generated carrier lifetimes in the semiconductor waveguide in accordance with the teachings of the present invention.

To illustrate, FIG. 2A shows another embodiment of a top view of an optical waveguide 211 in accordance with the teachings of the present invention. FIG. 2B shows one embodiment of a cross-section view of optical waveguide 211 according to embodiments of the present invention. In one embodiment, waveguide 211 is a silicon rib waveguide and may correspond to second optical waveguide 111 of FIG. 1, but is not necessarily limited to the ring resonator structure illustrated in the embodiment of FIG. 1. Therefore, waveguide 211 in one embodiment may be a ring resonator or in another embodiment, waveguide 211 is not necessarily limited to being a ring resonator in accordance with the teachings of the present invention.

For example, in another embodiment in which waveguide 211 is not a ring resonator, waveguide 211 may include for example Bragg gratings 247 and 249 with a reverse biased P-I-N diode structure between them in waveguide 211. In such an embodiment, Bragg gratings 247 and 249 have a Bragg wavelength substantially equal to the wavelength $\lambda_S$ of second optical beam 219 to result in substantially high reflectivity of second optical beam 219. As a result, second optical beam 229 reflects back and forth between Bragg gratings 247 and 249 such that lasing and/or amplification of second optical beam 219 occurs in waveguide 211 between Bragg gratings 247 and 249 in accordance with the teachings of the present invention. In another embodiment, dichroic coatings may be placed on the facets of waveguide 211 producing similar result as Bragg gratings 247 and 249 by reflecting a particular wavelength of second optical beam 219. In another embodiment in which waveguide 211 is a ring resonator, dichroic coatings and/or Bragg gratings 247 and 249 are not necessary.

FIG. 2B shows that waveguide 211 in one embodiment is a rib waveguide, which includes a rib region 239 and a slab region 241. In one embodiment, the semiconductor material of waveguide 211 includes intrinsic silicon with a p+ doped region 243 and an n+ doped region 245 disposed on opposite lateral sides of slab region 241 outside an optical path or optical mode 218 through waveguide 211. In one embodiment, p+ doped region 243 is coupled to ground and n+ doped region 245 is coupled to $V_D$ such that the resulting P-I-N diode structure is adapted to be reverse biased in accordance with the teachings of the present invention. In one embodiment, $V_D$ is less than the breakdown voltage of the resulting P-I-N diode structure.

In one embodiment, rib region 239 of waveguide 211 has a width W=1.5 μm, waveguide 211 has a height H=1.35 μm, and an etch depth of 0.6 μm. As shown in the depicted embodiment, there is a separation between p+ doped region 243 and n+ doped region 245 of 6 μm. In one embodiment, p+ doped region 243 and an n+ doped region 245 with the separation of 6 μm gives almost no additional optical loss in accordance with the teachings of the present invention.

With the high reverse bias across p+ doped region 243 and n+ doped region 245, photo-generated free carriers are swept out the waveguide 211 quickly to reduce the number of free carriers in waveguide 211 in accordance with the teachings of the present invention. For example, for a carrier velocity of $3 \times 10^6$ cm/s, which is approximately three times smaller than the saturation speed of holes, a transit time of approximately 0.2 ns can be obtained for an optical waveguide accordance to embodiments of the present invention. In one embodiment, this reduced transit time is approximately two orders of magnitude shorter than that without a reverse bias.

Figure 3:
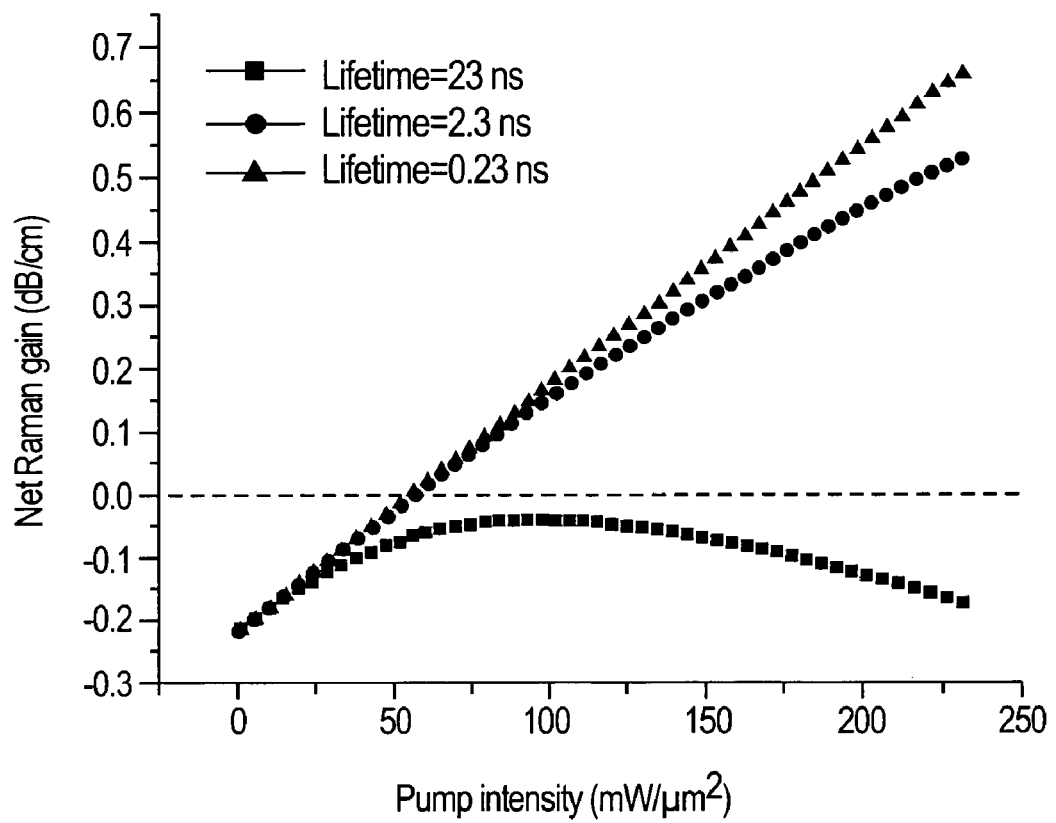
FIG. 3 is a diagram that shows the modeled net Raman gain of one embodiment of a silicon waveguide with different carrier lifetimes taking into account the linear waveguide loss in accordance with the teachings of the present invention.

FIG. 3 shows the modeled net Raman gain of one embodiment of a silicon waveguide with different carrier lifetimes taking into account the linear waveguide loss (0.22 dB/cm), the TPA, and the TPA-induced free carrier absorption in accordance with the teachings of the present invention. Without the reverse bias, the carrier lifetime is long (~23 ns) and there is substantially no net Raman gain even when the waveguide scattering loss is low (~0.22 dB/cm). However, when the lifetime is reduced by the reverse bias according to embodiments of the present invention, the net Raman gain is obtained due to the smaller photo-generated free carrier density. For example, as shown in FIG. 3, a Raman gain of approximately 0.5 dB/cm is achievable in one embodiment for 200 mW/μm$^2$ intensity if the transit time is 0.23 ns in accordance with the teachings of the present invention.

Figure 4:
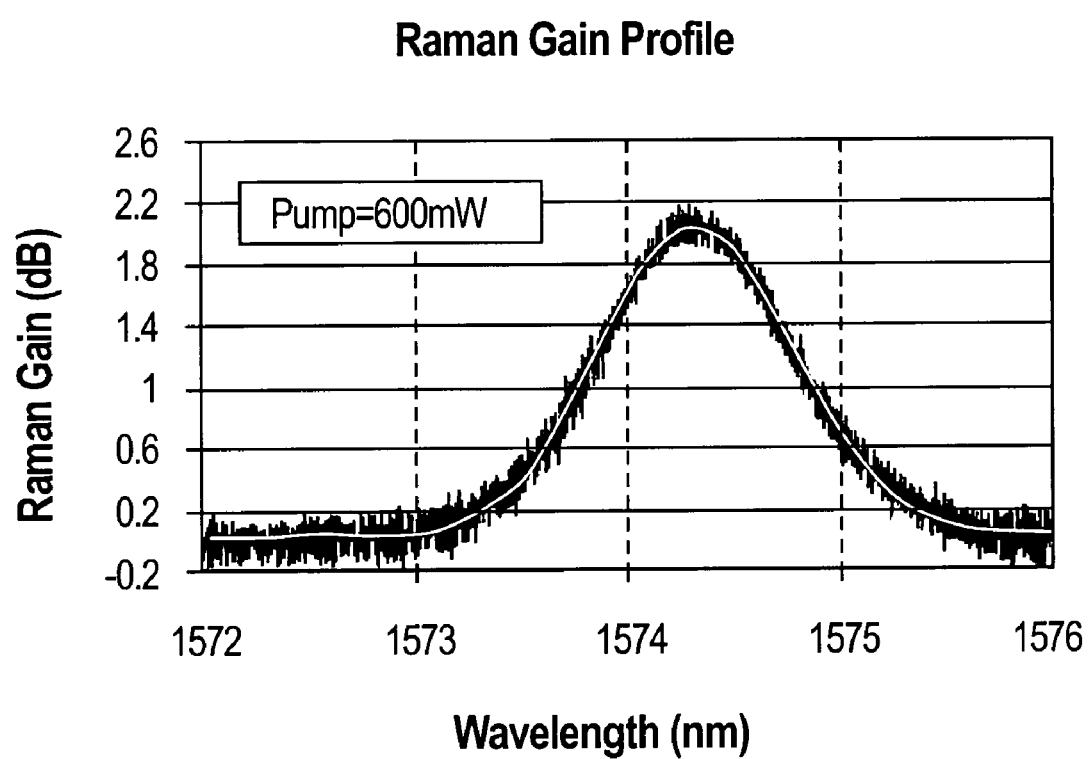
FIG. 4 is diagram that illustrates the measured Raman gain spectrum of one embodiment of a waveguide that is excited with an input pump laser.
Figure 5:
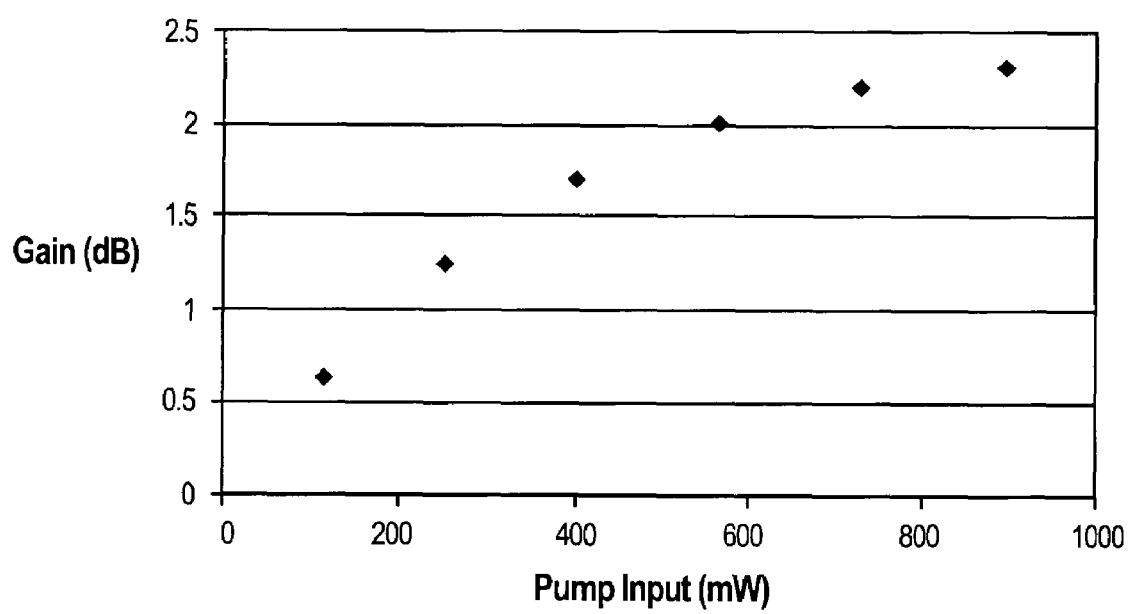
FIG. 5 is a diagram that illustrates the Raman gain saturation observed according to one embodiment versus pump power in accordance with the teachings of the present invention.
Figure 6:
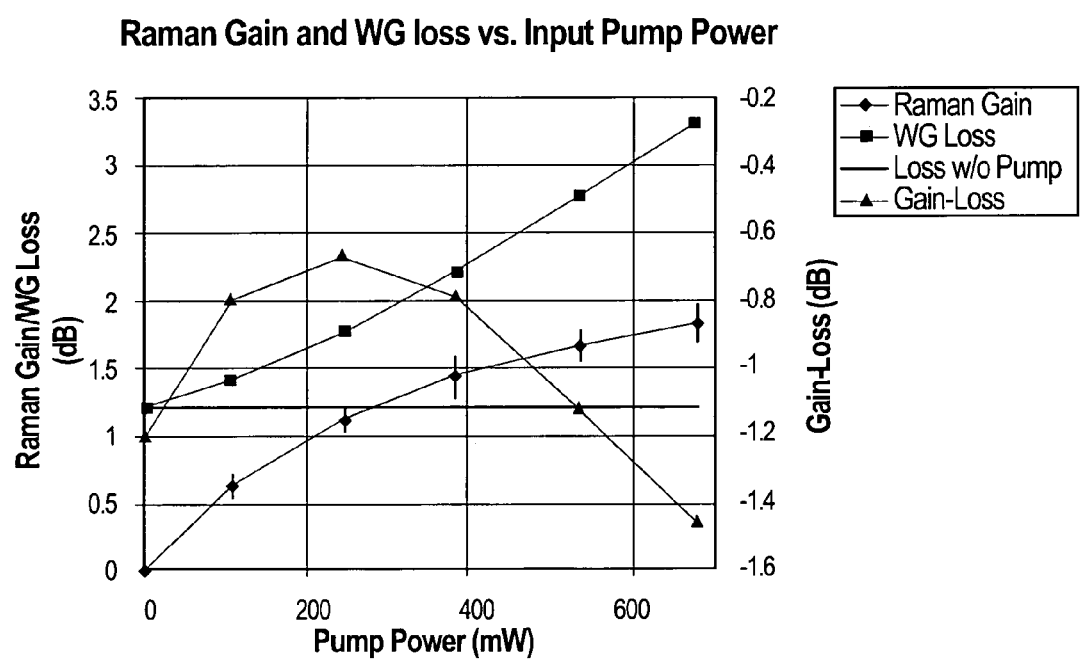
FIG. 6 is a diagram that illustrates a comparison of the measured Raman gain and waveguide loss in one embodiment as a function of the pump intensity in accordance with the teachings of the present invention.

FIG. 4 shows the measured Raman gain spectrum of a 5 cm-long waveguide with an input pump power of 600 mW. As shown, an approximately 2 dB peak Raman gain was obtained. FIG. 5 shows the Raman gain saturation that was observed owing to the TPA-induced free carrier absorption. As shown, a gain of approximately 2.3 dB was achieved with a pump input of approximately 900 mW. FIG. 6 shows a comparison of the measured Raman gain and waveguide loss as a function of the pump intensity. As can be appreciated from FIGS. 4, 5 and 6, the TPA-induced free carrier absorption is a limiting factor to achieve net Raman gain in silicon. Therefore, reducing the carrier lifetime is an efficient way to eliminate such effect in accordance with the teachings of the present invention.

It is noted that introducing defects and dopants in silicon could also shorten the carrier lifetime. However, doing so will usually introduce additional optical loss of the waveguide. In a P-I-N device according to embodiments of the present invention, the linear optical loss is not affected by the p+ doped region 243 and n+ doped region 245 because the doping regions are outside the optical path or optical mode 218 in accordance with the teachings of the present invention. In addition, for a smaller waveguide, which may be utilized in one embodiment for a low pump power Raman laser, the p+ and n+ separation can be even smaller than the example 6 µm separation summarized in the embodiment above. Therefore, the carrier transit time would be even further reduced in such an embodiment in accordance with the teachings of the present invention.

In examples described above, a reverse biased P-I-N semiconductor waveguide is employed to reduce TPA induced free carrier density to help achieve Raman lasing using continuous wave excitation. In another embodiment, a short pulse pump may be employed to reduce TPA induced free carrier density to help achieve Raman lasing. For instance, since the pump intensity of a short pulse pump only survives for a short time interval, the accumulated free carrier density will be lower than that in the continuous wave pump even when the peak pump intensity is the same. Therefore, there is a reduction of the TPA induced optical loss using pulsed pump laser when compared to a continuous wave laser in accordance with the teachings of the present invention.

Figure 7:
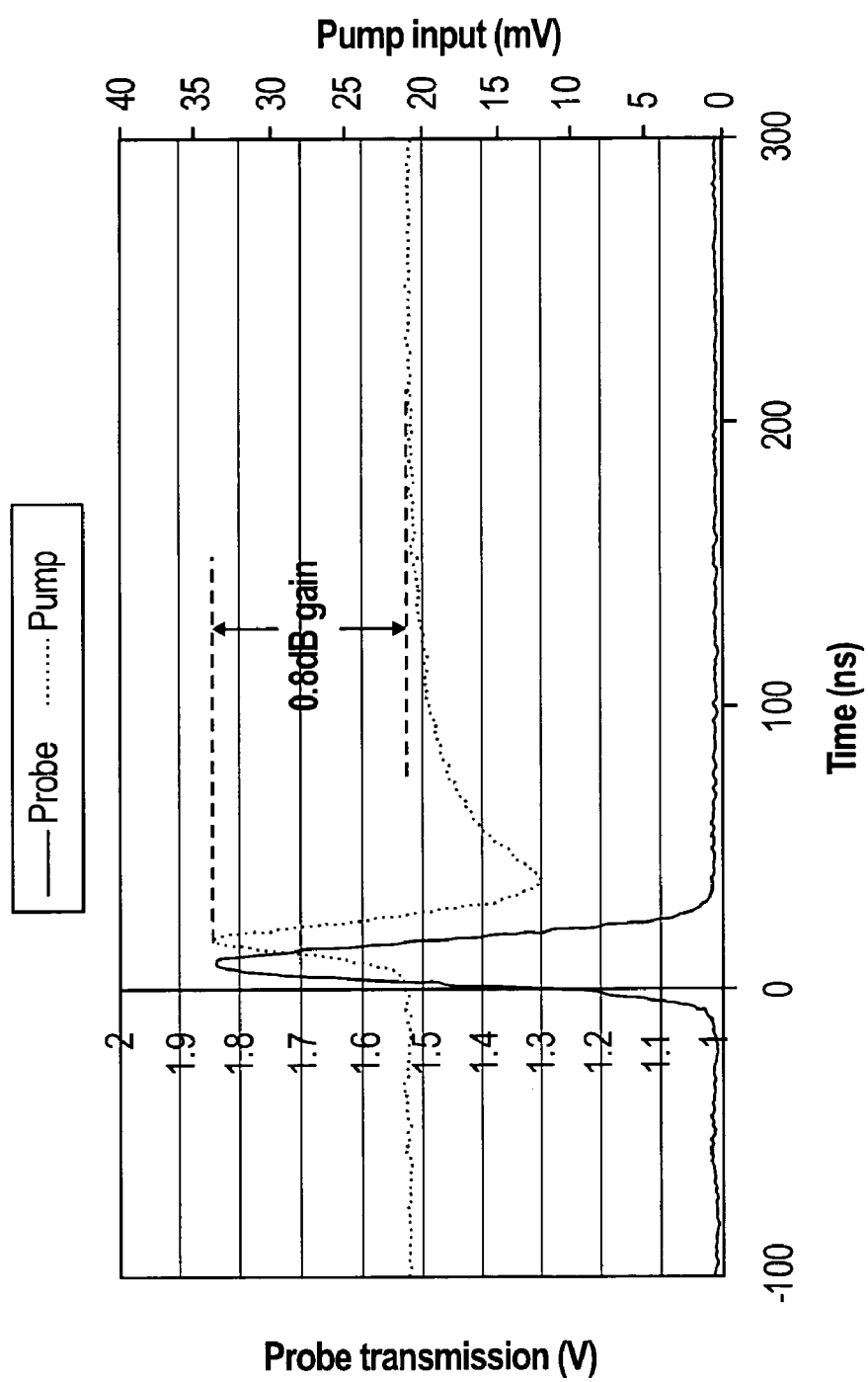
FIG. 7 is a diagram that illustrates a short pulse pump probe measurement for one embodiment of a waveguide in accordance with the teachings of the present invention.
Figure 8:
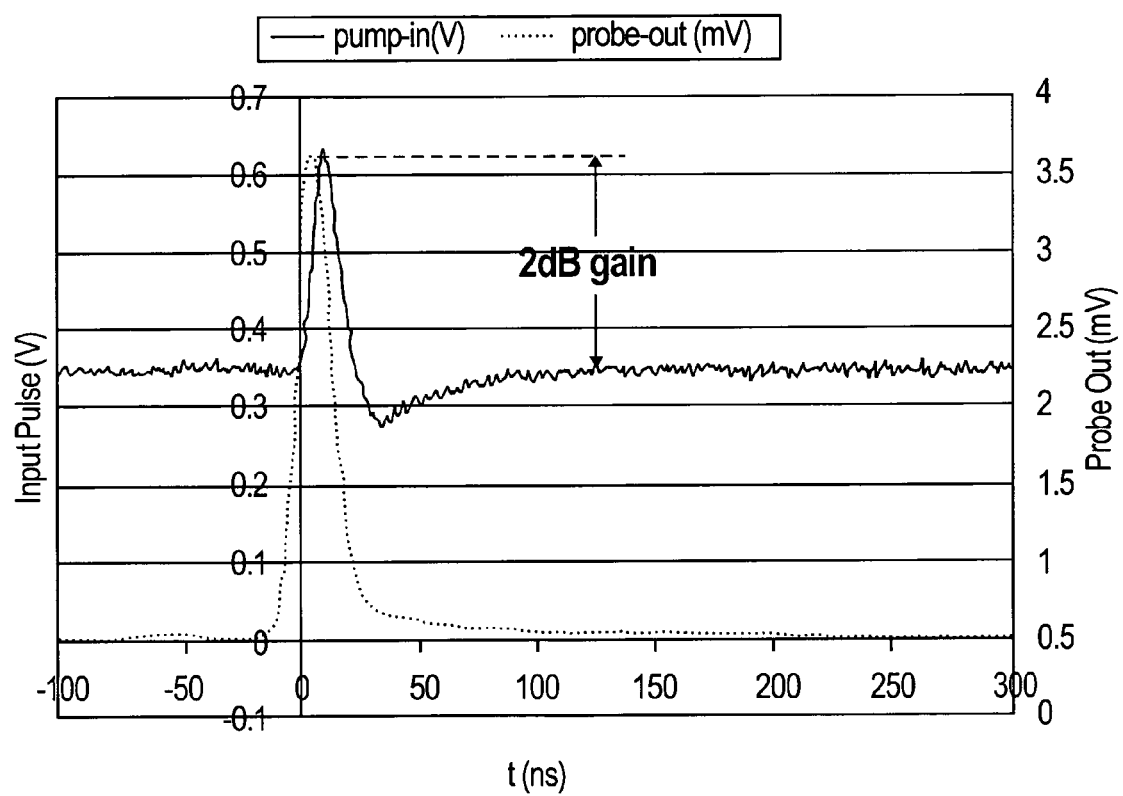
FIG. 8 is a diagram that illustrates a short pulse pump probe measurement for another embodiment of a waveguide in accordance with the teachings of the present invention.

To illustrate, FIG. 7 shows a short pulse pump probe measurement for a 4 µm waveguide having a waveguide length of 1.6 cm. As shown in the depicted embodiment, an approximately 0.8 dB gain is realized in accordance with the teachings of the present invention using a short pulse pump. This means that the observed Raman gain exceeds the TPA induced free carrier absorption loss by 0.8 dB. FIG. 8 shows another embodiment in which there is a short pulse pump probe measurement for a 1.5 µm waveguide having a waveguide length of 4.8 cm. As shown in the depicted embodiment, an approximately 2 dB gain is realized in accordance with the teachings of the present invention. Both FIGS. 7 and 8 suggest that real net optical gain can be obtained by reducing the TPA induced free carrier absorption and this would ultimately lead to Raman lasing for a low-loss silicon waveguide cavity like ring resonator illustrated in FIG. 1 and/or for a silicon waveguide with reverse biased P-I-N diode structure placed in between two Bragg gratings and/or dichroic coatings on the facets.

Figure 9:
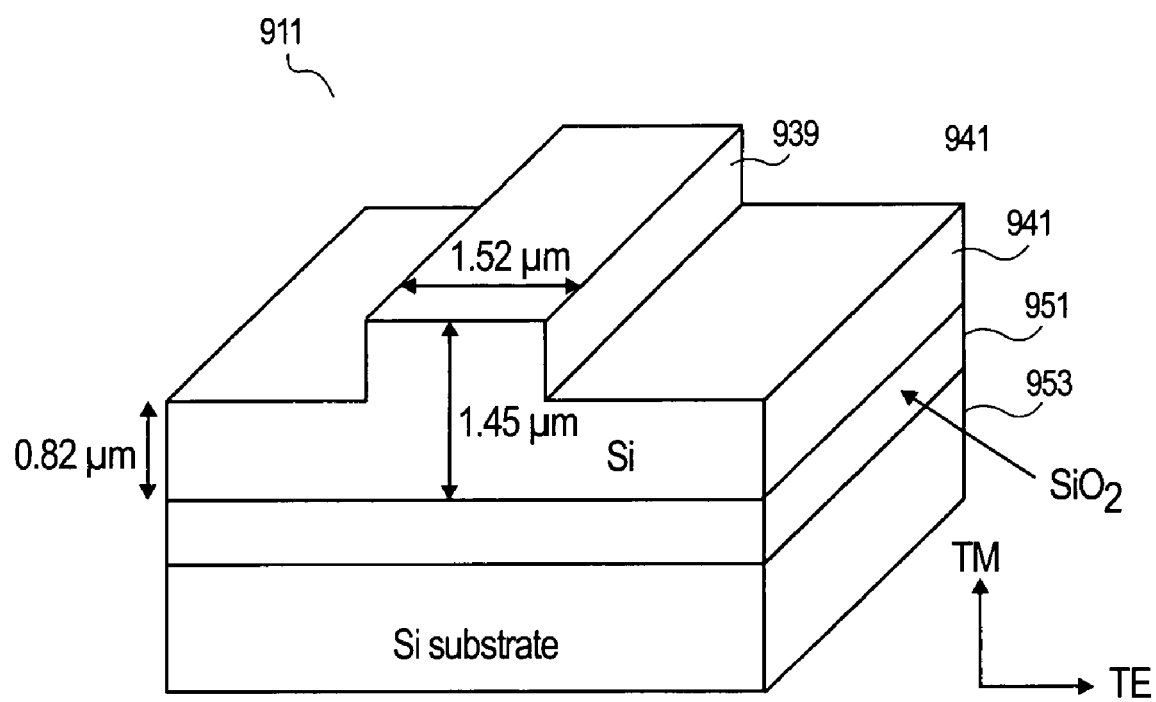
FIG. 9 is a diagram of another embodiment of an optical waveguide disposed in a silicon on insulator wafer in accordance with the teachings of the present invention.

FIG. 9 is a diagram of another embodiment of an optical waveguide 911 in accordance with the teachings of the present invention. In one embodiment, optical waveguide 911 is silicon rib waveguide disposed in a silicon on insulator wafer. In one embodiment, optical waveguide 911 is a low-loss silicon waveguide with a small cross section, which provides a net optical gain via SRS with reduced optical loss in accordance with the teachings of the present invention.

As shown in FIG. 9, one embodiment of optical waveguide 911 includes a rib region 939 and a slab region 941. In one embodiment, optical waveguide 911 is fabricated on the (100) surface of a lightly p-doped silicon-on-insulator (SOI) substrate using standard photolithographic patterning and reactive ion etching techniques. In one embodiment, the SOI substrate is included in an SOI wafer, which includes a buried insulating layer 951 and a silicon layer 953. In one embodiment, the lightly p-doped SOI substrate in which optical waveguide 911 is included has a doping concentration less than $2 \times 10^{15}$ cm$^{-3}$. As shown in the depicted embodiment, the rib region 939 has a width of approximately 1.52 µm and the height of optical waveguide 911 is approximately 1.45 µm, with an etch depth of approximately 0.63 µm such that the slab region has a height of approximately 0.82 µm. Accordingly, the effective core area of one embodiment of optical waveguide 911 is approximately 1.57 µm$^2$ for the TE mode and approximately 1.41 µm$^2$ for the TM mode of an optical beam directed through optical waveguide 911 at a wavelength of 1.55 µm.

The relatively small cross section of optical waveguide 911 reduces the optical power utilized to achieve a larger Raman gain since it is the optical intensity that determines the Raman scattering intensity in accordance with the teachings of the present invention. In one embodiment, optical waveguide is fabricated in an S-shaped curve in the SOI wafer with a total length of approximately 4.8 cm with a bend radius of approximately 400 µm to increase the pump-probe beam interaction length, which in turn results in larger Raman gain. The straight sections of optical waveguide 911 are oriented along the [011] direction of the silicon of the SOI wafer.

In one embodiment, the linear optical transmission loss of the optical waveguide 911 may be characterized by using a Fabry-Perot (FP) resonance technique at low input light power. In one embodiment, the facets of optical waveguide 911 are polished but uncoated to form a FP cavity. From the measured FP fringes generated using a tunable laser have a wavelength of approximately 1.55 µm and a modeled waveguide/air interface reflection coefficient based on 3-dimension finite difference time domain (FDTD) method, a linear loss of approximately 0.22 dB/cm is obtained for the 4.8 cm long optical waveguide 911 including the bend loss in accordance with the teachings of the present invention. In one embodiment, TE and TM modes have a similar transmission loss. In one embodiment, the waveguide facets are polished and an anti-reflection coating was applied to both facets to reduce Fresnel reflection losses for the SRS gain measurement using a pump-probe technique.

As mentioned above, the TPA in silicon resulting from continuous wave (CW) excitation may induce a significant amount of free carriers because of the relatively long carrier recombination lifetime. These photo-generated free carriers induce additional optical loss due to the free carrier plasma dispersion effect. Accordingly, in one embodiment, a pulsed pump laser is utilized instead of CW laser to reduce this effect in accordance with the teachings of the present invention. As such, the peak free carrier density generated by the TPA is significantly reduced in one embodiment when the pump pulse width is small relative to the carrier lifetime in optical waveguide 911 in accordance with the teachings of the present invention.

For instance, when optical waveguide 911 is excited by a laser pulse with an intensity profile of I(t, z), assuming that light propagates along the z direction, the TPA induced free carrier density [N(t, z)] is described by Equation 2:

$$\frac{dN(t,z)}{dt} = \frac{\beta}{2h\nu}I^2(t,z) - \frac{N(t,z)}{\tau} \quad (2)$$

In Equation 2, β is the TPA coefficient, hν is the one-photon energy, and τ is the carrier recombination lifetime. In one embodiment, the input pump pulse intensity profile can be described by a Gaussian shape of $$I(t,0) = I_0 \exp\left(-4\ln 2 \frac{t^2}{T_0^2}\right) \quad (3)$$

where $I_0$ is the peak intensity and $T_0$ is the full width at half maximum of the pulse. Taking into account the TPA and TPA induced free carrier absorption (FCA), the pump intensity evolution along the waveguide can be described by the following equation:

$$\frac{dI(t,z)}{dz} = -\alpha I(t,z) - \beta I^2(t,z) - \sigma N(t,z)I(t,z) \quad (4)$$

where $\alpha$ is the linear absorption coefficient and $\sigma$ is the free carrier absorption cross section. At the wavelength of 1.55 μm, $\sigma=1.45\times10^{-17}$ cm$^2$ for silicon. In one embodiment, the pump depletion effect in Equation 4 can be neglected because the Raman conversion efficiency is small. In addition, the pump pulse broadening effect due to waveguide dispersion can also be ignored in one embodiment since the pulse width used is relatively large (~17 ns) and the waveguide length is much shorter than the dispersion length. The SRS signal [$I_s(t,z)$] in the waveguide may be described by $$\frac{dI_s(t,z)}{dz} = -\alpha I_s(t,z) - (2\beta - g_r)I(t,z)I_s(t,z) - \sigma N(t,z)I_s(t,z) \quad (5)$$

where $g_r$ is the Raman gain coefficient. At the waveguide input, the probe beam is CW, i.e. $I_s(t,0)$=constant. However, inside the waveguide the probe signal is time dependent because of the pulsed pump and pump induced free carrier density. By solving coupled Equations 2, 4, and 5 with the input pulse shape described in Equation 3, one can obtain the pump and probe beam propagation properties as well as the time and position dependent free carrier density generated by the TPA in the silicon waveguide 911 in accordance with the teachings of the present invention.

Figure 10:
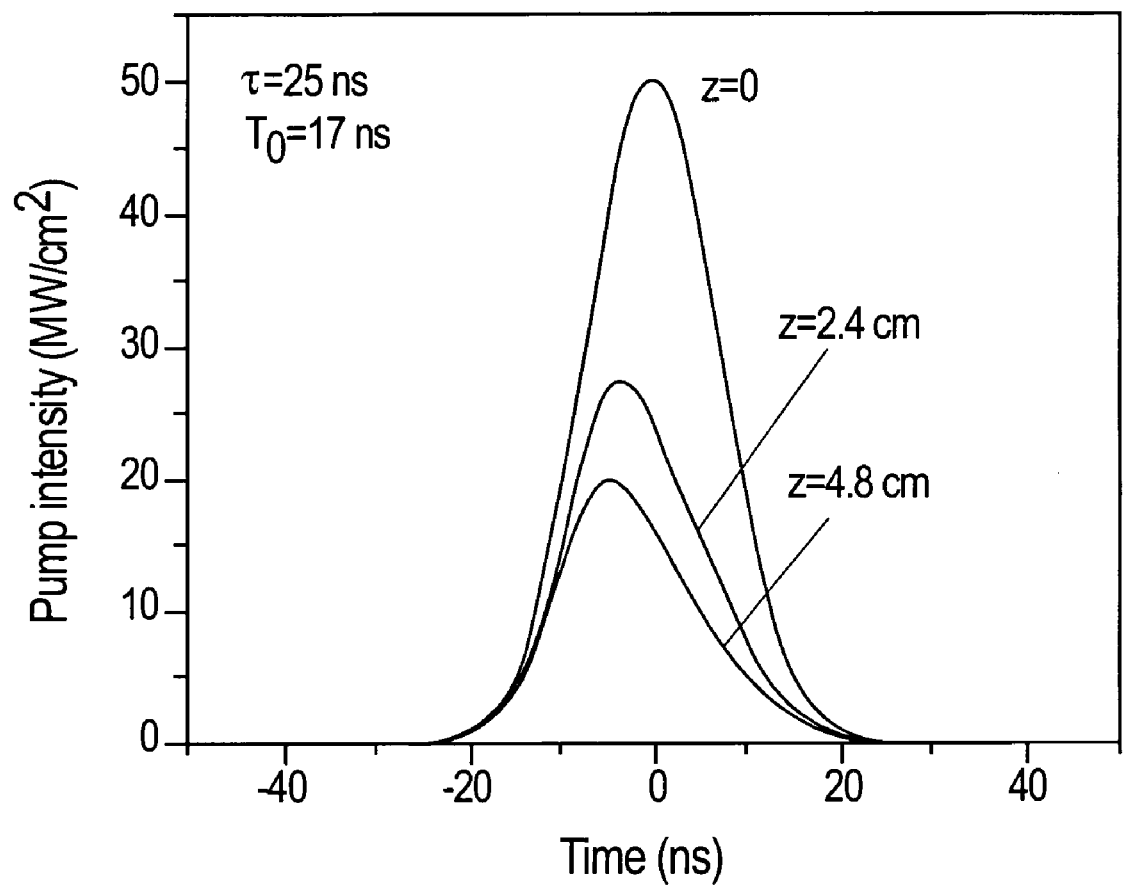
FIG. 10 is a diagram that illustrates the intensity profile of a pulsed pump laser over time along one embodiment of a waveguide in accordance with the teachings of the present invention.
Figure 11:
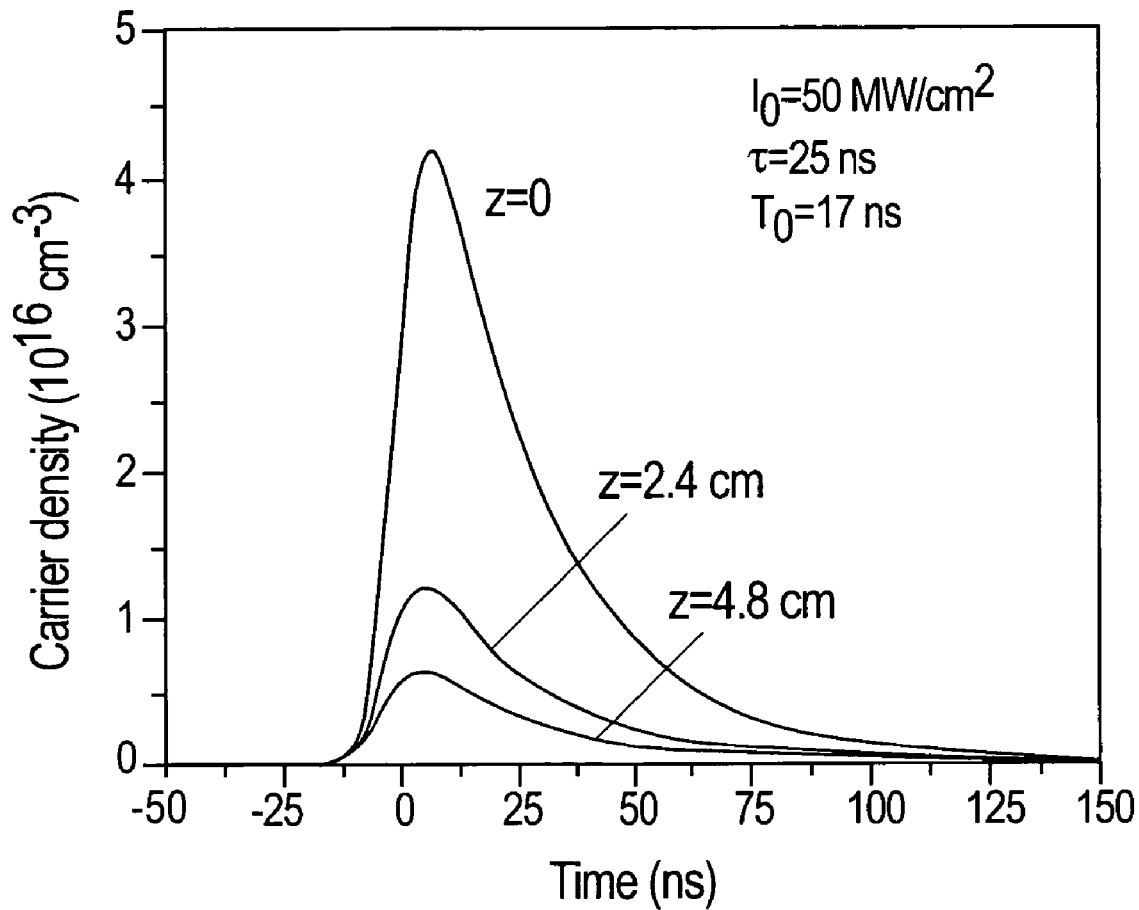
FIG. 11 is a diagram that illustrates a carrier density profile generated by a pulsed pump laser in one embodiment of a waveguide in accordance with the teachings of the present invention.

FIG. 10 shows the calculated pump pulse evolution along one embodiment of a 4.8 cm long waveguide in accordance with the teachings of the present invention. In one embodiment, a peak pump intensity of $I_0$=50 MW/cm$^2$, pulse width of $T_0$=17 ns, and a carrier lifetime of $\tau$=25 ns are utilized. The TPA coefficient is $\beta$0.5 cm/GW. The embodiment depicted in FIG. 10 shows that both the peak intensity and pulse shape change as the pump pulse propagates in the waveguide. The optical attenuation is due to both linear and nonlinear optical absorption. The asymmetry in the pump pulse shape is due to the photo-generated free carrier absorption effect. This can be more clearly seen from the modeled free carrier density profile, since the FCA is proportional to the carrier density. FIG. 11 shows the carrier density profile at three different positions, z=0, 2.4 and 4.8 cm along the waveguide with the same pumping conditions in the embodiment of FIG. 10. As shown in the embodiment depicted in FIG. 11, the time dependence of the carrier density is asymmetric and the peak density decreases as the pump beam propagates along the waveguide. The peak carrier density occurs slightly after the pump intensity reaches the maximum value. This results from the competition between the carrier generation and decay processes.

Figure 12:
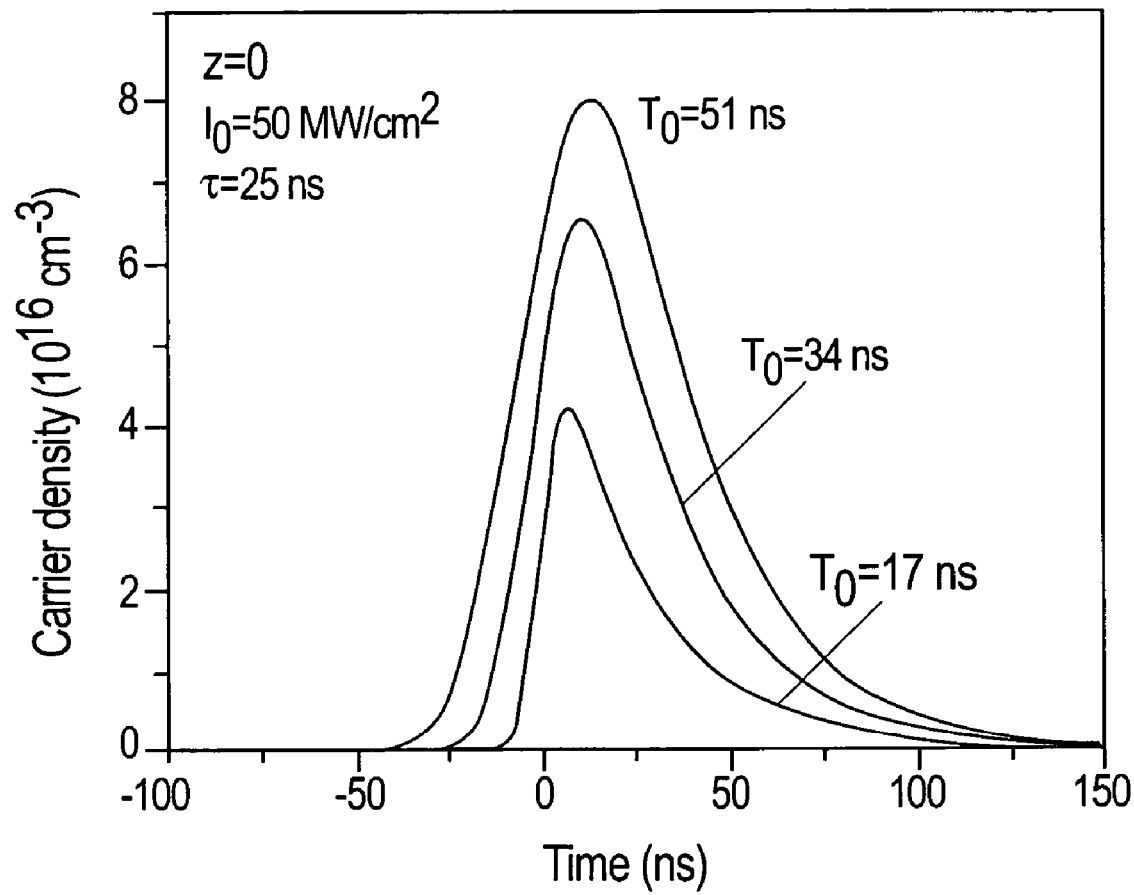
FIG. 12 is a diagram that illustrates a carrier density profile of one embodiment of a waveguide excited by a pulse laser with various pulse widths in accordance with the teachings of the present invention.

FIG. 12 shows one embodiment of a free carrier density profile of a silicon waveguide at z=0 excited by a pulsed laser with various pulse widths. As shown, the peak input intensity is $I_0$=50 MW/cm$^2$, the TPA coefficient is $\beta$=0.5 cm/GW and the carrier lifetime is $\tau$=25 ns. As shown, FIG. 12 indicates that the peak carrier density is strongly dependent on the pulse width for the same peak pump intensity. The narrower the optical pulse, the smaller the resulting carrier density. Thus, one can expect that the TPA induced FCA is smaller for a narrower pulse as compared to the CW excitation. This will help achieving net Raman gain in a silicon waveguide in accordance with the teachings of the present invention.

In one embodiment, the SRS of the silicon waveguide may be measured by use of pump-probe techniques. In this embodiment, a pulsed pump beam and a CW probe beam are combined with a wavelength multiplexer and coupled into the waveguide under investigation through free space mode-matching optics consisting of a pair of microscope objective lenses mounted on precision alignment stages. The output beam of the waveguide is collimated by another objective lens, and an optical filter is used to separate the pump and probe beams. The probe beam passes through the filter and is detected with a broadband photo-detector while the pump beam is blocked by the filter. Fiber polarization controllers are used to set the polarization states of the pump and probe beams. In one embodiment, the coupling efficiency into the waveguide is estimated by measuring the input and output power of the waveguide and taking the waveguide loss into account.

For the Raman gain measurements in one embodiment, the pump laser is a pulsed laser operating at 1545 nm with a pulse width of $T_0$=17 ns, and the probe laser is a CW external cavity tunable diode laser with a line width of <1 MHz. The probe laser power is 2 mW and its polarization is aligned with the TM mode of the waveguide. In one embodiment, the time dependent probe signal is measured both on and off the Raman wavelength for a given input pump power and pulse width.

Figure 13:
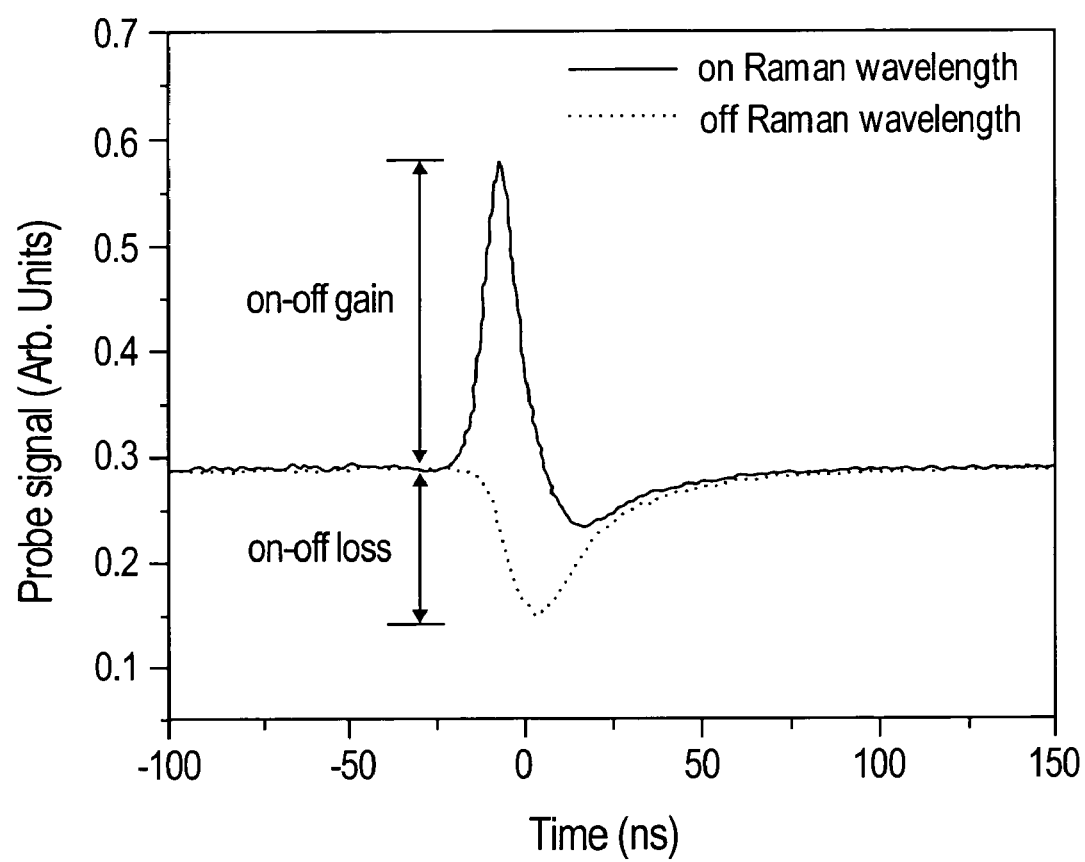
FIG. 13 is a diagram that illustrates a measured probe signal profile from one embodiment of a waveguide as a function of time in accordance with the teachings of the present invention.

To illustrate, FIG. 13 shows the measured probe signals of a 4.8 cm silicon waveguide in the presence of a pump pulse with a peak pump power of 470 mW in accordance with the teachings of the present invention. In particular, FIG. 13 shows a measured probe signal of a 4.8 cm long silicon waveguide as a function of time at on and off the Raman wavelength. In the illustrated embodiment, the peak pump power inside the waveguide is 470 mW and pump wavelength is 1.545 μm. The pump beam is TE polarized and the probe beam is TM polarized. As shown in FIG. 13, when the probe wavelength is off the Raman wavelength (in this case $g_r$=0), probe beam experiences additional optical loss (on-off loss is ~2.85 dB) mainly because of the pump pulse induced free carriers. In the embodiment where the probe wavelength is at the Raman wavelength, there is an increase of the probe signal and obtained on-off gain of ~3 dB. In this embodiment, the on-off gain (loss) is defined as the ratio between the probe signals on and off the probe signal peak (valley). Taking into account the linear waveguide loss of 0.22 dB/cm, a net gain of G=2 dB is obtained for the waveguide. The net gain G of a waveguide is defined as $$G = 10\log\frac{I_{out}}{I_{in}} \quad (6)$$

where $I_{in}$ and $I_{out}$ are the input probe intensity and peak output probe intensity inside the waveguide at the Raman wavelength. Thus the waveguide length dependence of the Raman gain is implicitly included in Equation 6.

Figure 14:
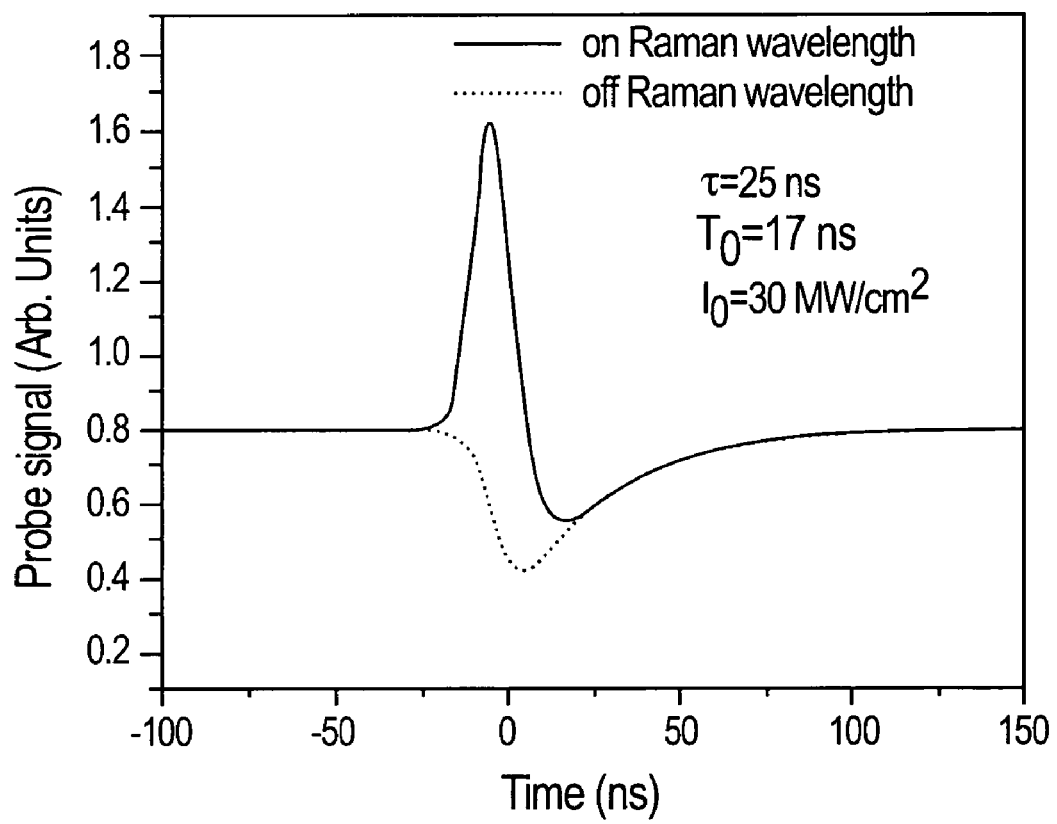
FIG. 14 is a diagram that illustrates a simulated probe signal profile as a function of time in one embodiment of a waveguide in accordance with the teachings of the present invention.

FIG. 14 shows the one embodiment of the probe signal for a 4.8 cm long waveguide with $T_0$=17 ns, $I_0$=30 MW/cm$^2$, and $\tau$=25 ns. By comparing the embodiments shown in FIGS. 13 and 14, it is observed that the on-off gain and loss as well as the probe signal profiles are consistent in accordance with the teachings of the present invention.

Figure 15:
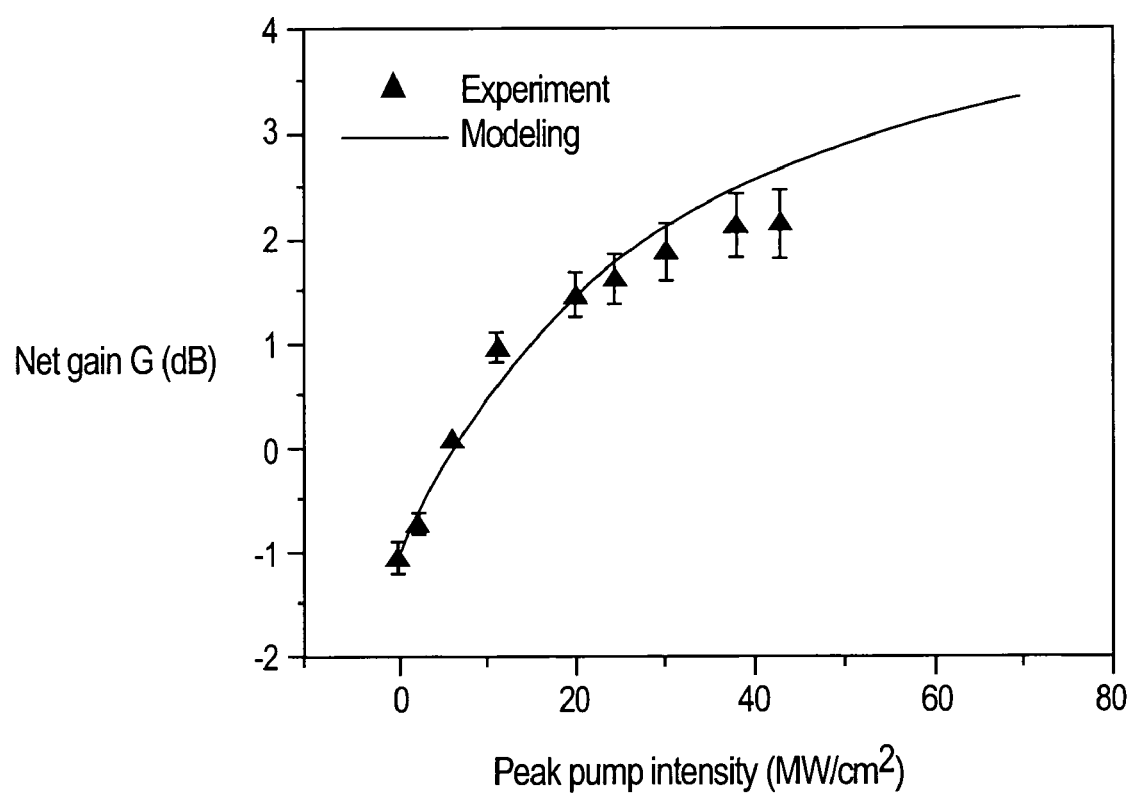
FIG. 15 is a diagram that illustrates net Raman gain as a function of pump intensity for one embodiment of a waveguide in accordance with the teachings of the present invention.

FIG. 15 shows the modeled and measured net Raman gain as a function of the pump intensity for one embodiment of an optical waveguide in accordance with the teachings of the present invention. As shown in FIG. 15, net Raman gain is illustrated as a function of the pump intensity for a 4.8 cm long silicon waveguide. In the illustrated embodiment, the Raman gain coefficient used is $g_r$=10.5 cm/GW. The other parameters are pulse width $T_0$=17 ns and carrier lifetime $\tau$=25 ns.

Figure 16:
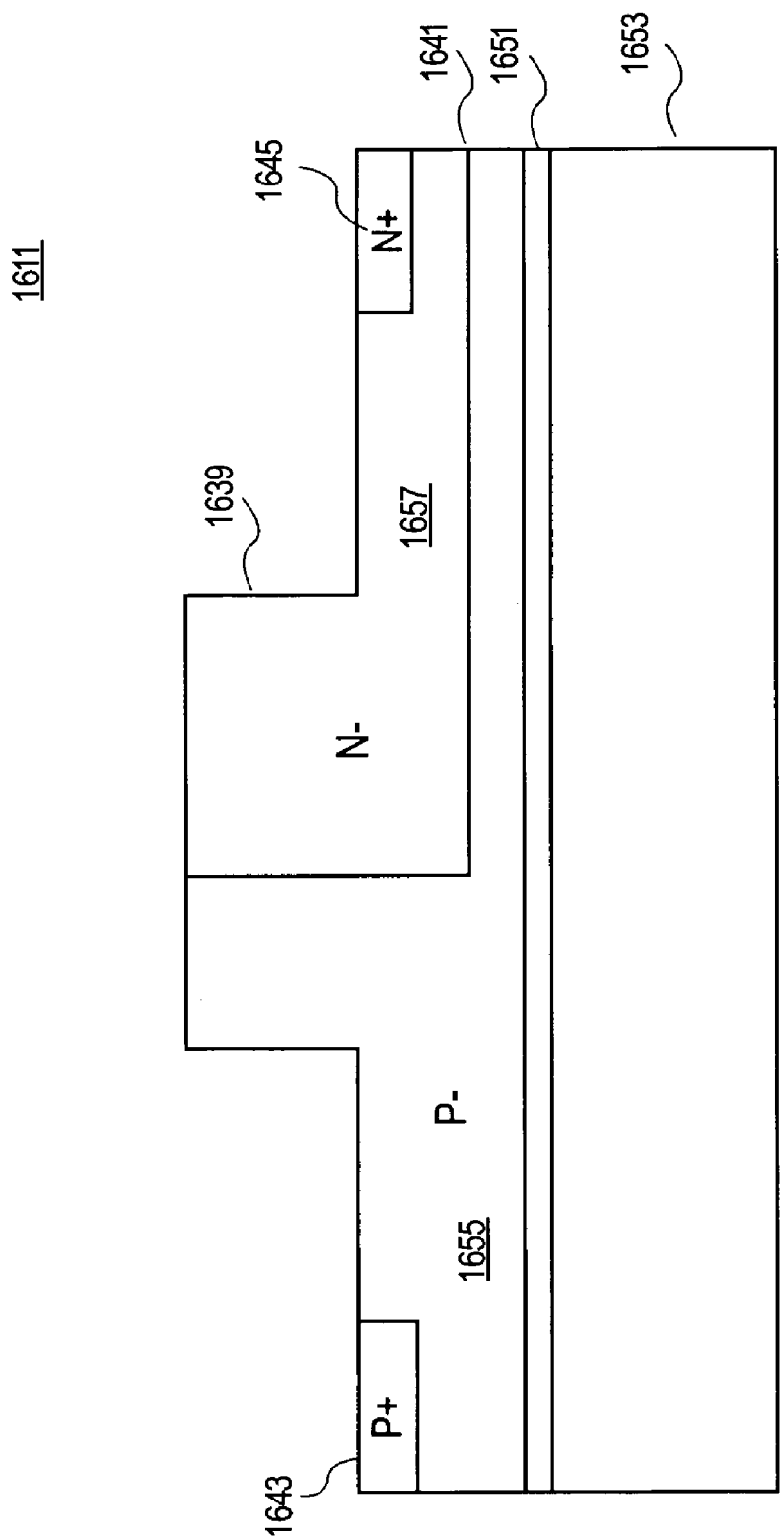
FIG. 16 is a cross section view illustration of one embodiment of a semiconductor waveguide including a PN junction diode structure to reduce two-photon absorption generated carrier lifetimes in the semiconductor waveguide in accordance with the teachings of the present invention.

FIG. 16 is a cross section view illustration of one embodiment of a semiconductor waveguide 1611 including a PN junction diode structure to reduce two-photon absorption generated carrier lifetimes in the semiconductor waveguide in accordance with the teachings of the present invention. In one embodiment, waveguide 1611 is a silicon rib waveguide and includes rib region 1639 and slab region 1641. In one embodiment, waveguide 1611 is fabricated on an SOI wafer, which includes a buried oxide layer 1651 and another silicon layer 1653. In one embodiment, waveguide 1611 includes higher doped P+ region 1643, lower doped P− region 1655, lower doped N− region 1657 and higher doped region 1645 as illustrated in FIG. 16. In one embodiment, P+ 1643 and N+ 1645 are disposed on opposite lateral sides of slab region 1641 outside an optical path or optical mode through waveguide 1611. In one embodiment, P+ region 1643 may be coupled to ground and N+ region 1645 is coupled to a voltage $V_D$ such that there is a reverse bias at the PN junction at the interface between P− 1655 and N− 1657 regions to create an electric field in waveguide 1611 such that photo-generated free carriers are swept out the waveguide 1611 quickly to reduce the number of free carriers in waveguide 1611 in accordance with the teachings of the present invention.

Figure 17:
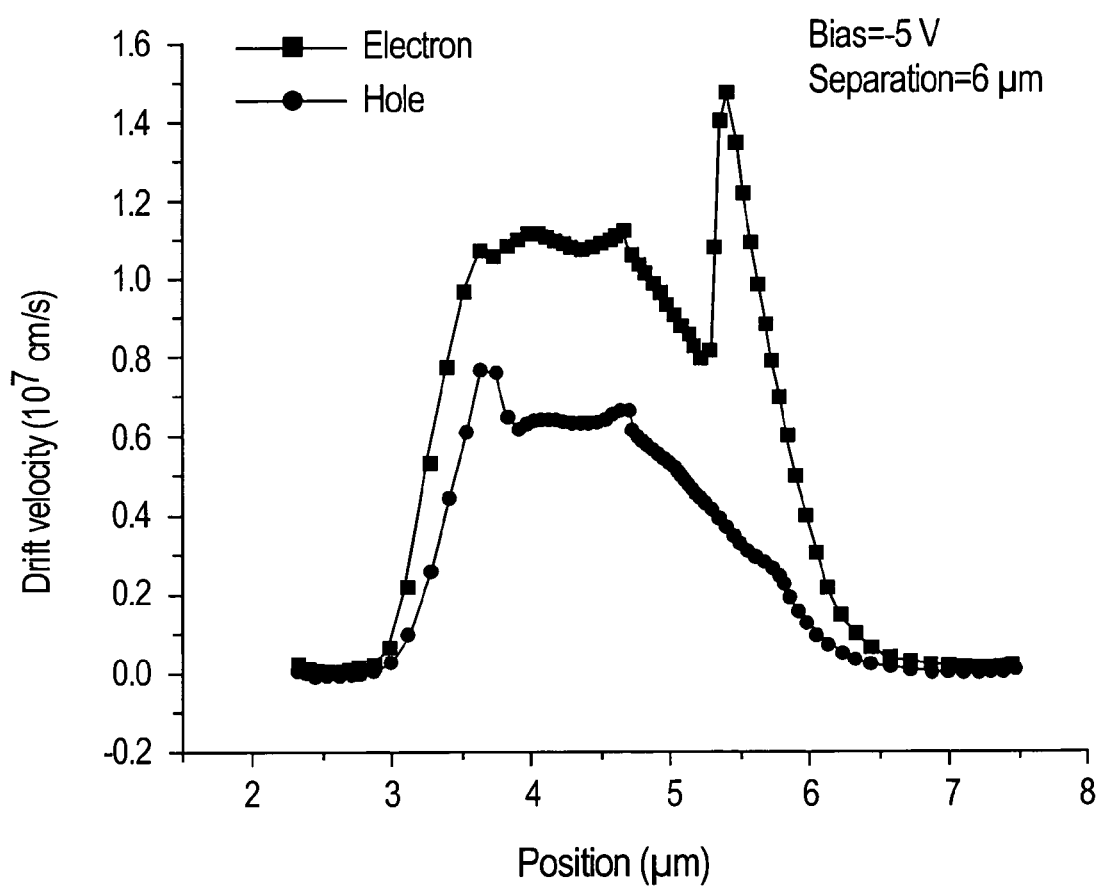
FIG. 17 is a diagram illustrating the drift velocity of electrons and holes in one embodiment a semiconductor waveguide having a PN junction diode structure to reduce two-photon absorption generated carrier lifetimes in the semiconductor waveguide in accordance with the teachings of the present invention.

To illustrate, FIG. 17 shows the drift velocity of electrons and holes in one embodiment a semiconductor waveguide having a PN junction diode structure such as for example waveguide 1611 of FIG. 16. In the example embodiment, waveguide 1611 is biased at −5 volts with a separation distance of 6 μm between P+ region 1643 and N+ region 1645. As shown in the depicted embodiment, the drift velocities of electrons and holes are substantially increased in the portion of waveguide 1611 through the optical mode between the P+ region 1643 and N+ region 1645 of waveguide 1611 in accordance with the teachings of the present invention. This embodiment is effective for removing photo-generated free carriers for instances where waveguide 1611 is not intrinsic and or has doping concentrations greater than for example $2\times10^{15}$ cm$^{-3}$.

Figure 18:
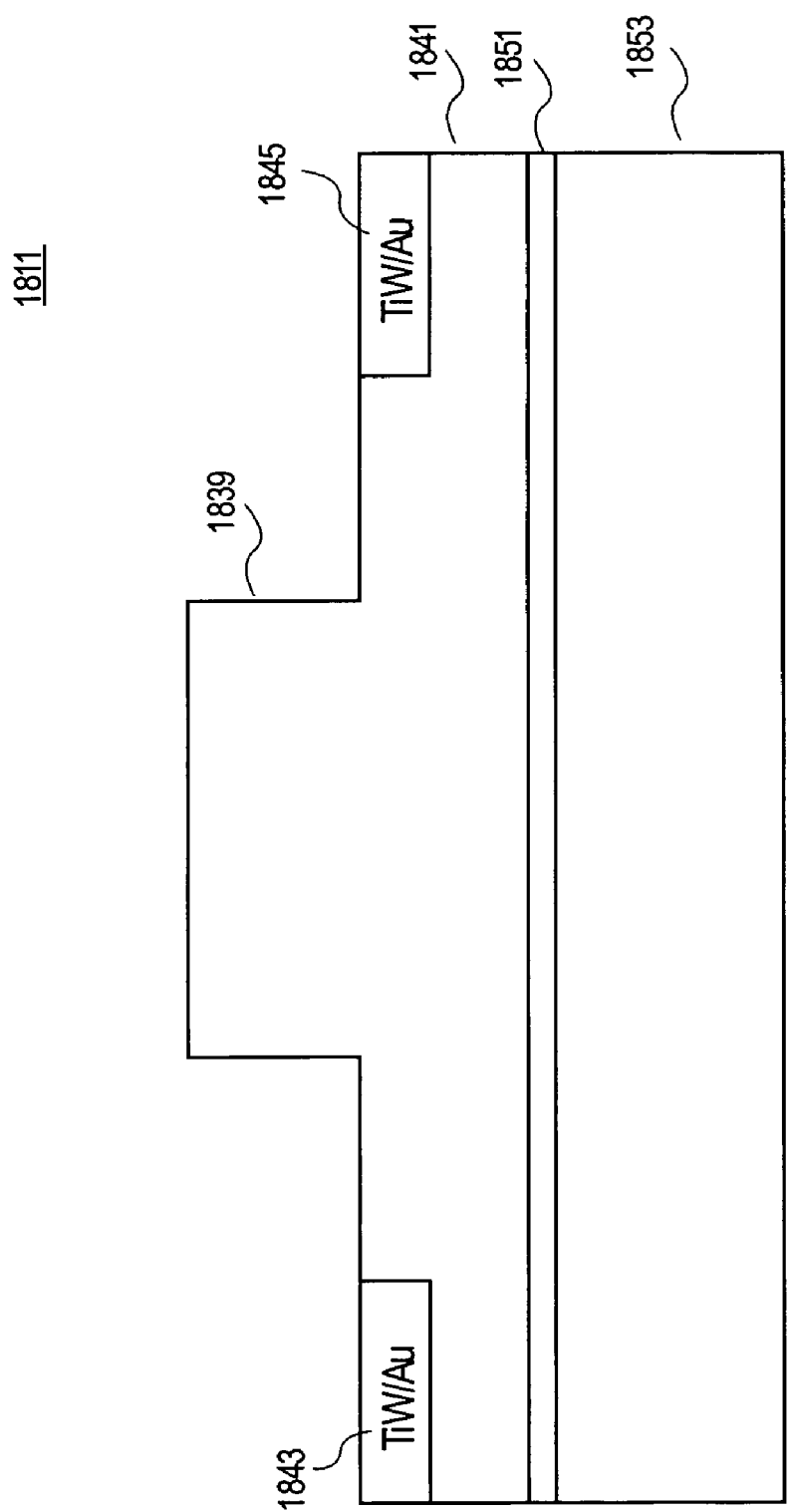
FIG. 18 is a cross section view illustration of one embodiment of a semiconductor waveguide having a MSM Schottky diode structure to reduce two-photon absorption generated carrier lifetimes in the semiconductor waveguide in accordance with the teachings of the present invention.

FIG. 18 is a cross section view illustration of one embodiment of a semiconductor waveguide 1811 having a metal-semiconductor-metal (MSM) structure to reduce two-photon absorption generated carrier lifetimes in the semiconductor waveguide in accordance with the teachings of the present invention. In one embodiment, waveguide 1811 is a silicon rib waveguide and includes rib region 1839 and slab region 1841. In one embodiment, waveguide 1811 is fabricated on an SOI wafer, which includes a buried oxide layer 1851 and another silicon layer 1853. In one embodiment, metal regions 1843 and 1845, which are disposed on opposite lateral sides of slab region 1841 outside an optical path or optical mode through waveguide 1811. In one embodiment, metal regions 1843 and 1845 include materials such as for example but not limited to titanium, tungsten and gold (TiW/Au) such that Schottky diode structures are formed with the resulting MSM structure. In one embodiment, the Schottky diodes are biased accordingly to create an electric field in waveguide 1811 such that photo-generated free carriers are swept out of the waveguide 1811 quickly to reduce the number of free carriers in waveguide 1811 in accordance with the teachings of the present invention.

Figure 19:
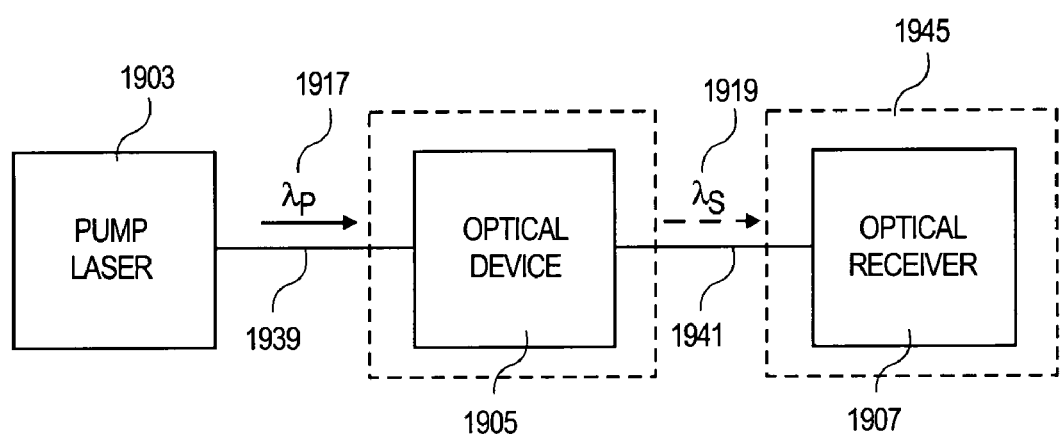
FIG. 19 is a block diagram illustration of a system including an optical device employing a semiconductor based Raman laser according to embodiments of the present invention.

FIG. 19 illustrates generally a block diagram of one embodiment of a system including pump laser and an optical receiver with an optical device to provide a semiconductor-based Raman laser according to embodiments of the present invention. In particular, FIG. 19 shows optical system 1901 including a pump laser 1903 to generate a pump signal or optical beam 1917 having a wavelength $\lambda_P$ having a first power level.

First optical beam 1917 is then received by an optical device 1905, which in one embodiment includes a Raman laser in accordance with the teachings of the present invention. In one embodiment, optical device 1905 is similar to for example embodiments of Raman lasers discussed above. For example, optical device 1905 may include an optical waveguide similar to optical waveguide 111 of FIG. 1, optical waveguide 211 of FIG. 2, optical waveguide 911 of FIG. 9, waveguide 1611 of FIG. 16, or waveguide 1811 of FIG. 18, or the like. In one embodiment, pump laser 1903 is external to semiconductor material 1943 in which optical device 1905 is disposed. In another embodiment, pump laser 1903 may be disposed in the same semiconductor material 1943 in which optical device 1905 is disposed. In one embodiment, pump laser 1905 is a continuous wave laser. In another embodiment, pump laser 1905 is a short pulse laser.

In one embodiment, optical device 1905 is adapted to receive first optical beam 1917 and stimulate the emission of a second optical beam 1919 of a wavelength $\lambda_S$. In one embodiment, the power level of first optical beam 1917 is sufficient to cause emission of second optical beam 1919 in an optical waveguide included in optical device 1905 via SRS and lasing in accordance with the teachings of the present invention. In one embodiment, an optical receiver 1907 is then coupled to receive the second optical beam 1919 having the wavelength $\lambda_S$ in accordance with the teachings of the present invention.

In one embodiment, first optical beam 1917 is coupled to be received by optical device 1905 through an optical conduit 1939. In one embodiment, second optical beam 1919 is coupled to be received by optical receiver 1907 through an optical conduit 1941. In one embodiment, optical conduits 1939 and 1941 may include for example one or more optical fibers, optical waveguides, free space or other suitable optical conduits in accordance with the teachings of the present invention.

In one embodiment, system 1901 may be included in a single computer system with pump laser 1903, an optical device 1905 and optical receiver 1907 being included in internal components of the computer system. For example, in one embodiment, system 1901 may be a computer system, such as for example a personal or laptop computer, with optical device 1905 included in a processor included in semiconductor material 1943 of the computer system and optical receiver 1907 being included in for example an internal card 1945 of the computer system, such as for example a video controller card, a network interface card, memory or the like. In such an embodiment, optical communications may be provided between the processor included in semiconductor material 1943 that includes optical device 1905 and the internal card 1945 that includes optical receiver 1907. In another embodiment, system 1901 may be included in a single chip or chipset with pump laser 1903 and optical receiver 1907 being internal components of the chip or chipset. In still another embodiment, system 1901 may be included in a communications network with laser 1903 and optical receiver 1907 being included in separate components of the communications network.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
an optical waveguide disposed in semiconductor material, wherein the optical waveguide is included in a ring resonator disposed in the semiconductor material; and
a diode structure disposed in the optical waveguide, the optical waveguide being coupled to a pump laser to receive a first optical beam having a first wavelength and a first power level to result in emission of a second optical beam of a second wavelength in the semiconductor waveguide, the diode structure being reverse biased to reduce two-photon absorption generated carrier lifetimes in the optical waveguide.

2. The apparatus of claim 1 wherein the diode structure includes:
a P+ doped region disposed on a lateral side of the optical waveguide; and an N+ doped region disposed on an opposite lateral side of the optical waveguide.

3. The apparatus of claim 2 wherein the diode structure includes intrinsic semiconductor material disposed between the P+ doped and N+ doped regions.

4. The apparatus of claim 2 wherein the diode structure further includes:
P− doped region in which the P+ doped region is disposed; and
an N− doped region in which the N+ doped region is disposed.

5. The apparatus of claim 1 wherein the diode structure includes a metal-semiconductor-metal structure.

6. The apparatus of claim 5 wherein the metal-semiconductor-metal structure includes a Schottky diode structure.

7. The apparatus of claim 1 wherein the pump laser includes one of a pulsed laser or a continuous wave laser.

8. The apparatus of claim 1 further comprising first and second reflectors, wherein the diode structure disposed in the optical waveguide between the first arid second reflectors.

9. The apparatus of claim 8 wherein the first and second reflectors comprise one or more Bragg gratings or dichroic coatings.

10. The apparatus of claim 1 wherein the two-photon absorption induced free carrier density is reduced in the optical waveguide.

11. A method, comprising:
directing a first optical beam of a first wavelength and a first power level into an optical waveguide defined in a semiconductor material;
causing emission of a second optical beam of a second wavelength in the optical waveguide with the first optical beam having the first power level sufficient to cause the emission of the second optical beam, wherein causing the emission of the second optical beam of the second wavelength in the optical waveguide comprises circulating the second optical beam around a ring resonator including the optical waveguide to further stimulate the emission of the second optical beam in the optical waveguide; and
reducing two-photon absorption generated carrier lifetimes by reverse-biasing a diode structure included in the optical waveguide.

12. The method of claim 11 wherein directing the first optical beam of the first wavelength and the first power level into the optical waveguide comprises directing a continuous wave laser beam into the optical waveguide.

13. The method of claim 11 wherein directing the first optical beam of the first wavelength and the first power level into the optical waveguide comprises directing a pulsed laser beam into the optical waveguide.

14. The method of claim 11 wherein sweeping out the free carriers from the optical waveguide comprises biasing a PN junction structure included in the optical waveguide to sweep out the free carriers from the optical waveguide generated in response to two photon absorption in the optical waveguide.

15. The method of claim 11 wherein sweeping out the free carriers from the optical waveguide comprises biasing a P-I-N junction structure included in the optical waveguide to sweep out the free carriers from the optical waveguide generated in response to two photon absorption in the optical waveguide.

16. The method of claim 11 wherein sweeping out the free carriers from the optical waveguide comprises biasing a metal-semiconductor-metal structure included in the optical waveguide to sweep out the free carriers from die optical waveguide generated in response to two photon absorption in the optical waveguide.

17. The method of claim 11 wherein causing the emission of the second optical beam of the second wavelength in the optical waveguide comprises reflecting the second optical beam between first and second reflectors included in the optical waveguide to further stimulate the emission of the second optical beam in the optical waveguide.

18. A system, comprising:
a pump laser to generate a first optical beam having a first wavelength and a first power level;
an optical device including an optical waveguide disposed in semiconductor material, the optical waveguide being included in a ring resonator disposed in the semiconductor material, the optical device further including a diode structure disposed in the optical waveguide, the optical waveguide optically coupled to receive the first optical beam, the first power level of the first optical beam sufficient to cause the emission of the second optical beam of a second wavelength in the optical waveguide, the diode structure biased to sweep out free carriers from the optical waveguide generated in response to two photon absorption in the optical waveguide;
an optical receiver optically coupled to receive the second optical beam from the optical device; and an optical fiber optically coupled between the optical device and the optical receiver to optically couple the optical receiver to receive the second optical beam from the optical device.

19. The apparatus of claim 18 further comprising first and second reflectors, wherein the diode structure disposed in the optical waveguide between the first and second reflectors.

20. The system of claim 18 wherein the two-photon absorption induced free carrier density is reduced in the optical waveguide.

21. The apparatus of claim 18 wherein the pump laser includes one of a pulse laser or a continuous wave laser.

22. The system of claim 18 wherein the diode structure includes:
a P+ doped region disposed on a lateral side of the optical waveguide; and
an N+ doped region disposed on an opposite lateral side of the optical waveguide.

23. The system of claim 22 wherein the diode structure includes intrinsic semiconductor material disposed between the P+ doped and N+ doped regions.

24. The system of claim 22 wherein the diode structure further includes:
a P− doped region in which the P+ doped region is disposed; and
an N− doped region in which the N+ doped region is disposed.

25. The system of claim 18 wherein the diode structure includes a metal-semiconductor-metal structure.

26. The system of claim 25 wherein the metal-semiconductor-metal structure includes a Schottky diode structure.

27. An apparatus, comprising:
optical waveguide disposed in semiconductor material; and
a diode structure disposed in the optical waveguide, the optical waveguide to be coupled to a pump laser to receive a first optical beam having a first wavelength and a first power level to result in stimulated Raman scattering of a second optical beam of a second wavelength in the semiconductor waveguide, the diode structure being reverse biased to reduce the number of free carriers in the optical waveguide generated in response to two photon absorption in the optical waveguide.

28. The apparatus of claim 27 further comprising first and second reflectors, wherein the diode structure disposed in the optical waveguide between the first and second reflectors.

29. The apparatus of claim 28 wherein the first and second reflectors comprise one or more Bragg gratings or dichroic coatings.

30. The apparatus of claim 27 wherein the optical waveguide is included in a ring resonator disposed in the semiconductor material.

31. The apparatus of claim 27 wherein the pump laser includes one of a pulsed laser or a continuous wave laser.

32. The apparatus of claim 27 wherein the diode structure includes:
a P+ doped region disposed on a lateral side of the optical waveguide; and
an N+ doped region disposed on an opposite lateral side of the optical waveguide.

33. The apparatus of claim 32 wherein the diode structure includes intrinsic semiconductor material disposed between the P+ doped and N+ doped region.

34. The apparatus of claim 32 wherein the diode structure further includes:
a P− doped region in which the P+ doped region is disposed; and
an N− doped region in which the N+ doped region is disposed.

35. The apparatus of claim 27 wherein the diode structure includes a metal-semiconductor-metal structure.

36. The apparatus of claim 35 wherein the metal-semiconductor-metal structure.

* * * * *

UNITED STATES PATENT AND TRADEMARK OFFICE
CERTIFICATE OF CORRECTION

PATENT NO. : 7,266,258 B2 Page 1 of 1
APPLICATION NO. : 10/933652
DATED : September 4, 2007
INVENTOR(S) : Liu et al.

It is certified that error appears in the above-identified patent and that said Letters Patent is hereby corrected as shown below:

In column 13, at line 60, delete "arid" and insert --and--.

In column 14, at line 41, delete "die" and insert --the--.

In column 16, at line 27, delete "region." and insert --regions.--.

In column 16, at line 37, after "structure" insert --includes a Schottky diode structure.--.

Signed and Sealed this

Twenty-ninth Day of April, 2008

JON W. DUDAS
*Director of the United States Patent and Trademark Office*